Feb. 10, 1925.  
A. TERESA  
WHEEL  
Original Filed Nov. 6, 1923  2 Sheets-Sheet 2

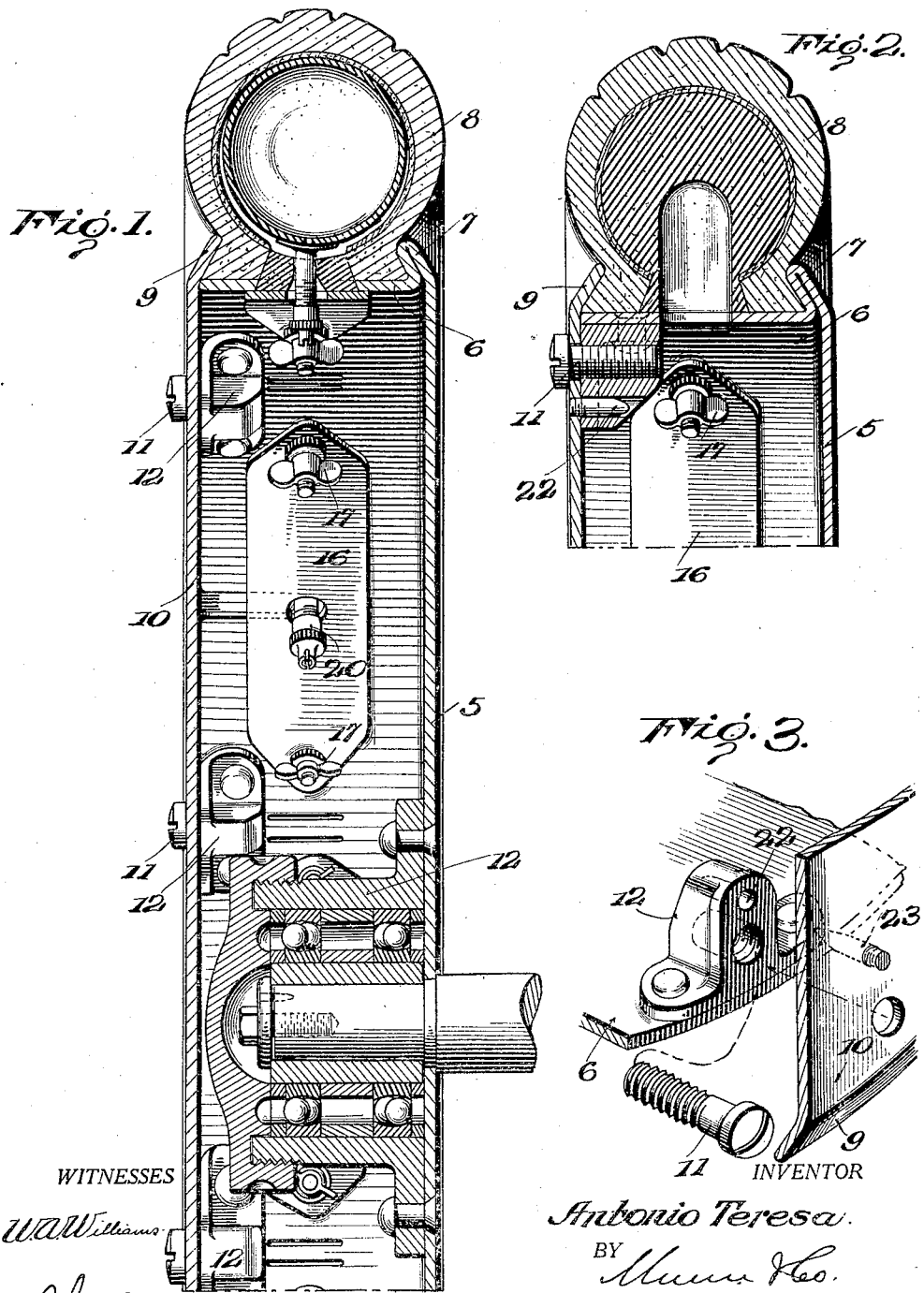

1,525,898

INVENTOR  
Antonio Teresa.  
BY  
ATTORNEYS

Patented Feb. 10, 1925.

1,525,898

UNITED STATES PATENT OFFICE.

ANTONIO TERESA, OF HABANA, CUBA.

WHEEL.

Application filed November 6, 1923, Serial No. 673,143. Renewed January 6, 1925.

*To all whom it may concern:*

Be it known that I, ANTONIO TERESA, a subject of the King of Spain, and a resident of Habana, Cuba, have invented certain new and useful Improvements in Wheels, of which the following is a specification.

This invention relates to wheels especially adapted for use on motor vehicles.

Briefly stated an important object of the invention is to provide a wheel having an integral rim and tire retaining flange and novel means to hold the tire in position.

A further object of the invention is to provide a wheel consisting principally of a pair of parallel metallic disks having novel means whereby the same may be connected so as to conceal the hub and the various parts on the inner side of the rim.

A further object is to provide a wheel which is of highly simplified construction, durable in use and cheap to manufacture.

Other objects and advantages will be apparent during the course of the following description.

In the accompanying drawing, forming a part of this application and in which like numerals are employed to designate like parts throughout the same, Figure 1 is a detail vertical sectional view through the improved wheel.

Figure 2 is a similar view illustrating the means to connect one of the disks to the rim.

Figure 3 is a group perspective illustrating the means to position and connect one of the flanges to the rim.

Figure 4:
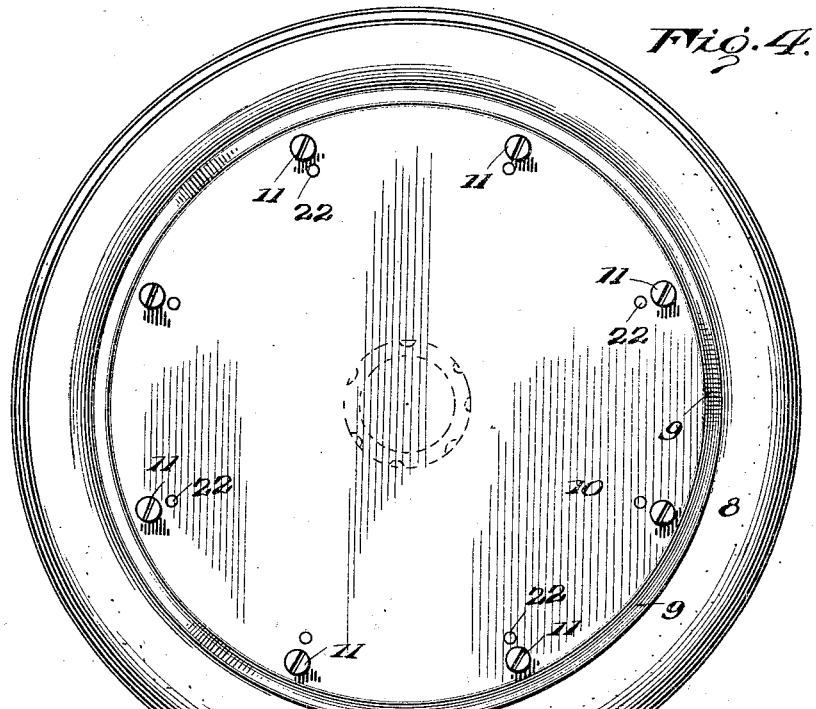
Figure 4 is a side elevation of the improved wheel equipped with a tire.
Figure 5:
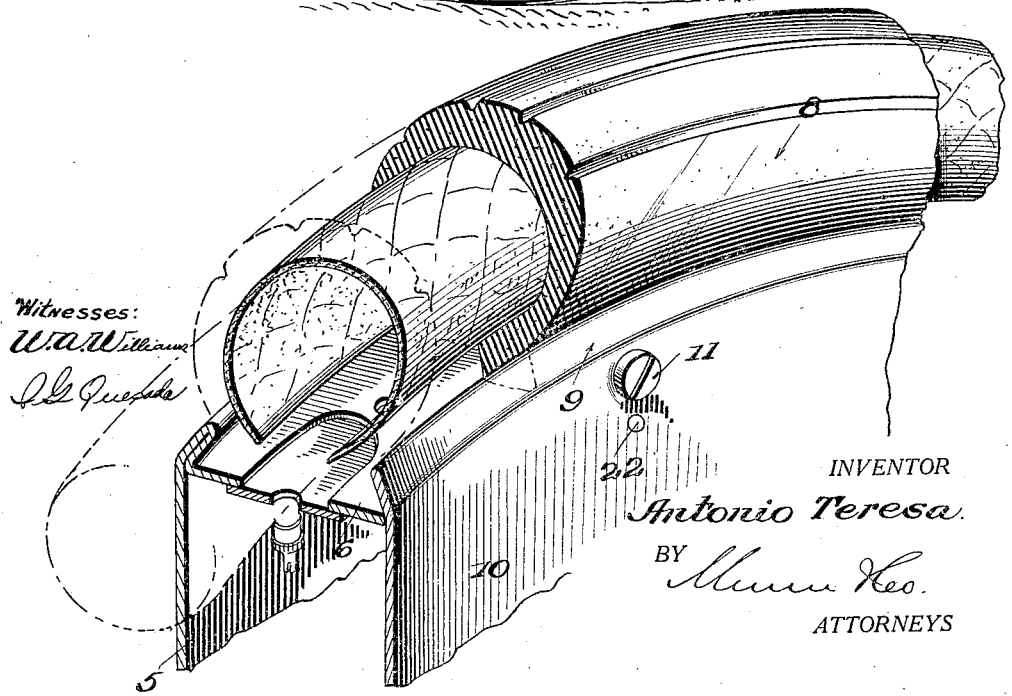
Figure 5 is a sectional perspective of the improved wheel.

In the drawing wherein for the purpose of illustration is shown the preferred embodiment of the invention, the numeral 5 designates the inner disk, the outer edge portion of which is extended laterally to define a rim 6. Between the rim 6 and the disk or body 5 the blank of metal from which the disk and the rim are formed is extended outwardly to define a flange 7 of a double thickness. Of course the improved wheel and more particularly the body from which the disk 5 and the rim 6 is formed is depressed from a single blank of metal.

A tire 8 is arranged about the rim 6 and is secured thereto by the inwardly extending edge portion 9 of a disk 10. A series of fastening bolts 11 are extended through the outer edge portion of the disk 10 at spaced points and are threaded into lugs 12 secured to the inner side of the rim 6.

In carrying out the invention a hub 12 is secured to the outer side of the inner disk 5 and inwardly of the outer disk so that the same is concealed from view and is protected from dust.

The rim 6 is also provided with a plurality of cover plates 16 held in place by fastening devices 17 and when removed the cover plates 16 provide access to the interior of the casing 8. This feature, however, forms no part of the invention forming the subject matter of this application, but is described, illustrated and claimed in a separate application.

When it is desired to gain access to the plates 16 or the stems 20 it is merely necessary to remove the disk 10. This, however, may be done without elevating the wheel. Figure 3 illustrates that each lug 12 is provided with a socket or opening 22 for the reception of a guide pin 23 by means of which the disk is properly positioned preparatory to the application of the wheel 11. Of course the pins 23 are tapered at their ends so that the same will readily enter the socket or opening 22.

When the outer disk is in place the wheel makes an extremely neat appearance and practically all parts are protected from dust and injury by the inner and outer spaced parallel disks.

Having thus described the invention, what is claimed is:

1. A wheel comprising a metallic disk having its outer edge portion extended laterally and formed with a flange, the laterally directed portion of said disk constituting a rim and having a plurality of inwardly directed lugs, and a disk connected to said lugs and projecting beyond the rim to form a second flange.

2. A wheel comprising a metallic disk having its outer edge portion extended laterally and formed with a flange, the laterally directed portion of said disk constituting a rim and having a plurality of inwardly directed lugs, a disk connected to said lugs and projecting beyond the rim to form a second flange, said lugs being provided with sockets, and pins carried by the inner side of the second named disk and received in said sockets whereby to position the second named disk.

3. A wheel comprising a disc having its outer edge portion extended laterally and formed with a tire-engaging flange, the laterally directed portion of the disc constituting a rim, said rim being provided with a plurality of lugs having openings, a second disc having guide pins adapted to extend into said openings, and fastening devices adapted to connect said second-named disc to said lugs.

ANTONIO TERESA.